United States Patent
Kim (10) Patent No.: US 12,280,806 B2
(45) Date of Patent: Apr. 22, 2025

(54) APPARATUS AND METHOD FOR CONTROLLING AUTONOMOUS DRIVING VEHICLE

(71) Applicants: Hyundai Motor Company, Seoul (KR); Kia Corporation, Seoul (KR)

(72) Inventor: Dong Hyuk Kim, Hanam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 260 days.

(21) Appl. No.: 17/968,498

(22) Filed: Oct. 18, 2022

(65) Prior Publication Data

US 2023/0294738 A1 Sep. 21, 2023

(30) Foreign Application Priority Data

Mar. 17, 2022 (KR) ........................ 10-2022-0033608

(51) Int. Cl.
*B60W 60/00* (2020.01)
*B60W 30/06* (2006.01)
*B60W 50/035* (2012.01)

(52) U.S. Cl.
CPC ...... *B60W 60/00186* (2020.02); *B60W 30/06* (2013.01); *B60W 50/035* (2013.01);
(Continued)

(58) Field of Classification Search
CPC ........... B60W 60/00186; B60W 30/06; B60W 50/035; B60W 2552/20; B60W 2754/30; B60W 2554/406; B60W 2720/106; B60W 2552/00; B60W 2552/05; B60W 2754/10; G05D 1/0061; G05D 1/0088; G05D 1/021; G05D 1/0214; G05D 1/0221; G05D 1/0223; B60K 28/00–165
(Continued)

(56) References Cited

U.S. PATENT DOCUMENTS 6,098,733 A * 8/2000 Ibaraki ............... B60W 50/029
  701/55
9,272,711 B1 * 3/2016 Sivaraman ............. G08G 1/161
(Continued)

FOREIGN PATENT DOCUMENTS

KR 20180082886 A 7/2018

*Primary Examiner* — Manglesh M Patel
(74) *Attorney, Agent, or Firm* — SLATER MATSIL, LLP (57) ABSTRACT

An apparatus and method for controlling a vehicle may comprise a processor and a memory. The processor determines whether a current driving situation of a broken vehicle in which the failure occurs is a parking mode or a driving mode, executes the parking mode logic to search for a parking location of the broken vehicle and parks the broken vehicle at the parking location, when the current driving situation is the parking mode, executes the driving mode logic such that the broken vehicle drives on driving route excluding a ramp while the broken vehicle maintains a first inter-vehicle distance from a forward vehicle, when the current driving situation is the driving mode, and executes the driving mode logic such that the broken vehicle drives while the broken vehicle maintains a second inter-vehicle distance longer than the first inter-vehicle distance, when the driving route includes a congestion section.

18 Claims, 6 Drawing Sheets

(52) U.S. Cl.
CPC ... *B60W 2552/20* (2020.02); *B60W 2554/406* (2020.02); *B60W 2720/106* (2013.01); *B60W 2754/30* (2020.02)

(58) Field of Classification Search
USPC .................................. 701/23, 25, 29.1, 29.2
See application file for complete search history.

(56) References Cited

U.S. PATENT DOCUMENTS

| | | | |
|---|---|---|---|
| 11,491,999 B2* | 11/2022 | Urano | G05D 1/0088 |
| 11,597,409 B2* | 3/2023 | Yu | B60W 60/0018 |
| 2003/0173127 A1* | 9/2003 | Noecker | B60W 30/16 |
| | | | 180/170 |
| 2013/0103296 A1* | 4/2013 | Koshizen | G01C 21/3691 |
| | | | 701/119 |
| 2014/0330479 A1* | 11/2014 | Dolgov | G01S 13/865 |
| | | | 701/28 |
| 2018/0046182 A1* | 2/2018 | Joyce | G01C 21/3453 |
| 2018/0052463 A1* | 2/2018 | Mays | G07C 5/0808 |
| 2019/0106117 A1* | 4/2019 | Goldberg | G05D 1/0055 |
| 2019/0113916 A1* | 4/2019 | Guo | A61B 5/6893 |
| 2019/0258253 A1* | 8/2019 | Tremblay | G01C 21/3617 |
| 2020/0031362 A1* | 1/2020 | Lee | B60W 50/0225 |
| 2020/0183384 A1* | 6/2020 | Noh | H04W 4/90 |
| 2020/0339151 A1* | 10/2020 | Batts | B60W 60/00186 |
| 2021/0300417 A1* | 9/2021 | Sarkar | B60W 30/0956 |
| 2021/0347371 A1* | 11/2021 | Lee | B60W 60/0053 |
| 2022/0063669 A1* | 3/2022 | Fukushige | B60W 40/08 |

* cited by examiner

APPARATUS AND METHOD FOR CONTROLLING AUTONOMOUS DRIVING VEHICLE

CROSS-REFERENCE TO RELATED APPLICATIONS

This application claims the benefit of Korean Patent Application No. 10-2022-0033608, filed on Mar. 17, 2022, which application is hereby incorporated herein by reference.

TECHNICAL FIELD

The present disclosure relates to an apparatus and method for controlling an autonomous vehicle.

BACKGROUND

A vehicle refers to an apparatus that moves on a road, and is equipped with various devices for passenger protection, driving assistance, and improvement of riding comfort.

Nowadays, research on an autonomous vehicle is being actively conducted such that the autonomous vehicle is capable of self-driving in a state where a driver's intervention in the driving of the vehicle is partially or completely excluded. The autonomous vehicle may determine a driving route by recognizing surrounding environments through a function of detecting and processing external information in autonomous driving and may drive independently by using its own power.

An autonomous driving function used in the autonomous vehicle may be implemented by operations of a plurality of electronic devices. Such the electronic devices may fail due to various factors. When a failure occurs in the implementation of the autonomous driving function, an accident may occur when countermeasures are not prepared in advance.

SUMMARY

The present disclosure has been made to solve the above-mentioned problems occurring in the prior art while advantages achieved by the prior art are maintained intact.

An aspect of the present disclosure provides an apparatus and method for controlling an autonomous vehicle that are capable of coping with a failure occurring in a vehicle in autonomous driving.

An aspect of the present disclosure provides an apparatus and method for controlling an autonomous vehicle that are capable of maintaining an autonomous driving mode by using active control when a failure occurs in a vehicle in autonomous driving.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an autonomous vehicle control apparatus includes a processor for controlling autonomous driving when a vehicle has a failure, and storage for storing driving mode logic and parking mode logic driven by the processor. The processor determines whether a current driving situation of a broken vehicle in which the failure occurs is a parking mode or a driving mode on a first driving route, executes the parking mode logic such that the parking mode logic searches for a parking location of the broken vehicle and parks the broken vehicle at the parking location, when the current driving situation is the parking mode, executes the driving mode logic such that the broken vehicle drives on a second driving route excluding a ramp while the broken vehicle maintains a first inter-vehicle distance from a forward vehicle, when the current driving situation is the driving mode, and executes the driving mode logic such that the broken vehicle drives while the broken vehicle maintains a second inter-vehicle distance longer than the first inter-vehicle distance, when the second driving route includes a congestion section.

In an embodiment, the autonomous vehicle control apparatus may further include a failure detection device for determining whether electronic parking of the vehicle fails, a parking location search device for determining a gradient for the respective parking location of the broken vehicle in which a failure of the electronic parking occurs and to search for the parking location, a vehicle movement determination device for determining a movement of the broken vehicle in a stopped state of the broken vehicle, a driving route determination device for setting the second driving route of the broken vehicle, and a stop necessity determination device for determining the congestion section in the driving mode of the broken vehicle.

In an embodiment, the processor may determine an operating mode as the parking mode when the broken vehicle arrives at a destination or near the destination and may determine the operating mode as the driving mode when the broken vehicle does not arrive near the destination.

In an embodiment, the parking location search device may search for the parking location having the gradient that is less than or equal to a specific value, when the current driving situation of the broken vehicle is the parking mode. The processor may park the broken vehicle at the found parking location.

In an embodiment, the processor may cause the vehicle movement determination device to execute a monitoring mode for monitoring a movement of the broken vehicle after the parking mode of the broken vehicle ends.

In an embodiment, the parking location search device may search for a parking location of the broken vehicle again when the monitored result indicates that the movement of the broken vehicle is detected. The processor may cause the broken vehicle to again park at the parking location.

In an embodiment, the processor may execute the driving mode logic such that the broken vehicle drives on the second driving route excluding the ramp having a gradient that is not less than a specific value when the current driving situation is the driving mode.

In an embodiment, the processor may cause the broken vehicle to decelerate when the second driving route includes the congestion section.

In an embodiment, the processor may cause the broken vehicle to stop while the broken vehicle maintains a third inter-vehicle distance from the forward vehicle, when it is necessary to stop the broken vehicle. The third inter-vehicle distance may be shorter than the first inter-vehicle distance.

In an embodiment, the processor may cause the broken vehicle to stop while the broken vehicle decelerates, when the forward vehicle is stopped.

In an embodiment, the processor may drive the broken vehicle at a first speed when the forward vehicle is driving and may drive the broken vehicle at a second speed slower than the first speed when the forward vehicle is stopped.

According to an aspect of the present disclosure, an autonomous vehicle controlling method includes determining whether a current driving situation of a broken vehicle in which a failure occurs in autonomous driving is a parking mode or a driving mode on a first driving route, executing a parking mode logic such that the parking mode logic searches for a parking location of the broken vehicle and parks the broken vehicle at the parking location, when the current driving situation is the parking mode, executing a driving mode logic such that the broken vehicle drives on a second driving route excluding a ramp while the broken vehicle maintains a first inter-vehicle distance from a forward vehicle, when the current driving situation is the driving mode, and executing the driving mode logic such that the broken vehicle drives while the broken vehicle maintains a second inter-vehicle distance longer than the first inter-vehicle distance, when the second driving route includes a congestion section.

In an embodiment, the determining of whether the current driving situation of the broken vehicle is the parking mode or the driving mode may include determining an operating mode as the parking mode when the broken vehicle arrives at a destination or near the destination and determining the operating mode as the driving mode when the broken vehicle does not arrive near the destination.

In an embodiment, the executing of the parking mode logic may include searching for the parking location having the gradient that is less than or equal to a specific value and parking the broken vehicle at the found parking location.

In an embodiment, the autonomous vehicle controlling method may further include determining a movement of the broken vehicle by executing a monitoring mode for monitoring a movement of the broken vehicle after the parking mode of the broken vehicle ends.

In an embodiment, the autonomous vehicle controlling method may further include searching for a parking location of the broken vehicle again when the monitored result indicates that the movement of the broken vehicle is detected and causing the broken vehicle to park at the found parking location.

In an embodiment, the executing of the driving mode logic may include executing the driving mode logic such that the broken vehicle drives on the second driving route excluding the ramp having a gradient that is not less than a specific value.

In an embodiment, the autonomous vehicle controlling method may further include causing the broken vehicle to decelerate when the second driving route includes the congestion section.

In an embodiment, the autonomous vehicle controlling method may further include causing the broken vehicle to stop while the broken vehicle maintains a third inter-vehicle distance from the forward vehicle, when it is necessary to stop the broken vehicle. The third inter-vehicle distance may be shorter than the first inter-vehicle distance.

In an embodiment, the autonomous vehicle controlling method may further include causing the broken vehicle to stop while the broken vehicle decelerates, when the forward vehicle is stopped.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF ILLUSTRATIVE EMBODIMENTS

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

The present disclosure relates to an apparatus and method for controlling an autonomous vehicle, and more particularly, relate to an apparatus and method for controlling an autonomous vehicle that are capable of coping with a failure occurring in a vehicle in autonomous driving.

Hereinafter, various embodiments of the present disclosure will be described in detail with reference to FIGS. 1 to 4.

Figure 1:
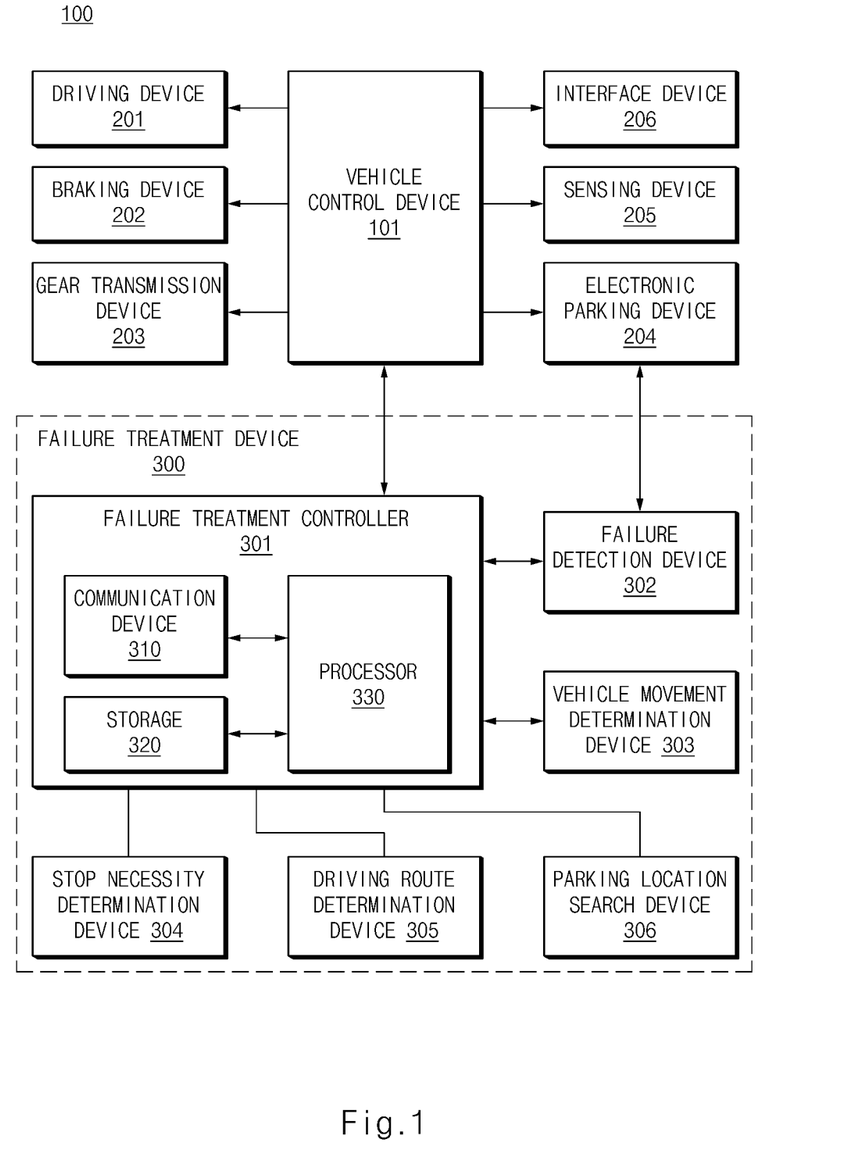
FIG. 1 is a block diagram illustrating a configuration of a vehicle system, to which an autonomous vehicle control apparatus is applied, according to an embodiment of the present disclosure.

FIG. 1 is a block diagram illustrating a configuration of an autonomous vehicle system including a vehicle control apparatus, according to an embodiment of the present disclosure.

Referring to FIG. 1, a vehicle system 100 including an autonomous vehicle control apparatus according to an embodiment of the present disclosure may include a vehicle control device 101, a driving device 201, a braking device 202, a gear transmission device 203, and an electronic parking device 204, a sensing device 205, an interface device 206, and a failure treatment device 300 (or an autonomous driving controlling apparatus).

The failure treatment device 300 according to an embodiment of the present disclosure may be implemented inside an autonomous vehicle. At this time, the failure treatment device 300 may be integrated with internal control units of a vehicle and may be implemented with a separate device so as to be connected to control units of the vehicle by means of a separate connection means.

The vehicle control device 101 may control an actuator included in the vehicle. For example, the vehicle control device 101 may control at least one of acceleration, deceleration, braking, or steering of an autonomous vehicle.

The vehicle control device 101 may enable stable driving of the autonomous vehicle by controlling at least one of the driving direction or speed of the autonomous vehicle.

The vehicle control device 101 may control the autonomous driving of the vehicle and may determine whether to activate an autonomous driving mode or whether to switch from the autonomous driving mode to a manual driving mode, based on the selection of a vehicle user (e.g., a driver, a passenger, or an owner).

The vehicle control device 101 may set a driving mode of the vehicle as a manual driving mode or an autonomous driving mode (an automatic driving mode).

For example, when receiving an autonomous driving request (e.g., a command for activating an autonomous driving function) from the interface device 206, the vehicle control device 101 may switch the driving mode of the vehicle from a manual driving mode to an autonomous driving mode.

The vehicle control device 101 may recognize a surrounding vehicle and a surrounding environment of the autonomous vehicle by using the sensing device 205 and may control the driving (autonomous driving) of the autonomous vehicle based on information about the recognized surrounding vehicle and surrounding environment.

When receiving an autonomous driving release command (an autonomous driving end request) in autonomous driving, the vehicle control device 101 may switch the driving mode of the autonomous vehicle from the autonomous driving mode to the manual driving mode.

The vehicle control device 101 may be implemented in a form of an independent hardware device including a memory and a processor for processing each operation and may be driven in a form included in other hardware devices such as a microprocessor or a general purpose computer system.

The driving device 201 may control an operation of a driving-related actuator in response to a driving control signal from the vehicle control device 101.

The driving device 201 may control the operation of an actuator that controls a longitudinal operation (e.g., a driving speed) of the vehicle. For example, the actuator for controlling the longitudinal operation may include a throttle and/or accelerator.

For example, the driving device 201 may include an engine management system (EMS). The engine management system may include an actuator that performs functions of electronic throttle control, gasoline direct injection, and idle stop and go.

The braking device 202 may control an operation of a braking-related actuator of the vehicle in response to a braking control signal from the vehicle control device 101. The braking device 202 may decelerate the vehicle by controlling the brakes of the vehicle. For example, the braking device 202 may include an electric parking brake (EPB) that generates braking power electronically rather than by human force.

The gear transmission device 203 may include an automated manual transmission (AMT) that automates a clutch and the manipulation of a shift lever. The AMT may automate a process of pressing a clutch pedal to interrupt power, changing a gear stage, and depressing the clutch pedal to supply power. Through the AMT, the vehicle user hardly needs to operate the clutch. Even though a gear stage is stage D depending on situations, the vehicle may be driven while the ignition is not turned off.

The gear transmission device 203 may control gear shifting. As a passenger in a vehicle manipulates a manipulation level, the gear transmission device 203 may switch automatic/manual shift, may select a driving mode (forward, neutral, reverse (DM, D, N, R, and RM)), and may change a gear stage (shifting: shift up/down), and may select a power/economy mode under the control of the vehicle control device 101 receiving a lever manipulation signal. For example, the gear transmission device 203 may control a gear shift for shifting a gear stage to stage N during waiting for a signal, waiting for parking for a long time, or stopping.

The electronic parking device 204 (an electronic parking brake) may control an operation of a wheel-related actuator of the autonomous vehicle in response to a parking control signal from the vehicle control device 101. The electronic parking device 204 may park the autonomous vehicle or may stop or decelerate the autonomous vehicle, by controlling each wheel of the autonomous vehicle.

The sensing device 205 may sense an external object (e.g., a vehicle, a pedestrian, a bicycle, or a motorcycle) positioned in the vicinity of the vehicle. The sensing device 205 may obtain information about at least one of a location of an external object, a distance from the external object, a speed of the external object, a moving direction of the external object, or the type of the external object.

To this end, the sensing device 205 may include at least one of various types of sensors such as an ultrasonic sensor, a radar or LiDAR sensor, a camera, a laser scanner and/or corner radar, LiDAR, an acceleration sensor, a yaw rate sensor, a torque measuring sensor, a wheel speed sensor, or a steering angle sensor.

For example, the sensing device 205 may obtain an image around the vehicle through a camera. Through the radar or LiDAR sensor, the sensing device 205 may detect an external object located in the vicinity of the vehicle. For example, the sensing device 205 may obtain a surrounding image of the vehicle and may analyze the obtained surrounding image. The autonomous vehicle may perform autonomous driving based on the analyzed surrounding image.

The interface device 206 may include an input means for receiving a control command from a user (e.g., a driver, an occupant, or a passenger) of the vehicle, and an output means for outputting an operating state and a result of the vehicle control device 101. The input means may include a key button, and may include at least one of a mouse, a joystick, a jog shuttle, or a stylus pen. Furthermore, the input means may include a soft key implemented on a display, or may include a voice recognition means.

The output means may include a display and may include a voice output means such as a speaker. At this time, when a touch sensor is included in the display, the display may operate as a touch screen and may be implemented in a form in which the input means and the output means are integrated with each other.

For example, the output means may output at least one of switching between an autonomous driving mode and a manual driving mode, a state where autonomous driving is activated, a state where autonomous driving is deactivated, a guidance indicating that autonomous driving is impossible, or a guidance indicating that autonomous driving is possible. For example, the output means may be implemented as at least one of a cluster, a head up display, an audio video navigation system (AVN), a display, an alarm sound speaker, or a haptic device.

According to an embodiment, at least some areas of the display may display driving status information of the autonomous vehicle. The driving status information may include at least one of external object information positioned outside the autonomous vehicle, navigation information, or vehicle status information.

The external object information may include at least one of information about whether there is an external object, information about a location of an external object, information about a distance between an autonomous vehicle and an external object, or information about a relative speed between an autonomous vehicle and an external object.

The navigation information may include at least one of map information, set destination information, route information according to settings of a destination, information about various external objects on a route, lane information, or current location information of an autonomous vehicle.

The vehicle status information may include at least one of vehicle attitude information, vehicle speed information, vehicle tilt information, vehicle weight information, vehicle direction information, vehicle battery information, vehicle fuel information, vehicle tire pressure information, vehicle steering information, vehicle indoor temperature information, vehicle indoor humidity information, pedal position information, or vehicle engine temperature information.

When a failure occurs in the vehicle in autonomous driving, the failure treatment device 300 may control the autonomous vehicle so as to maintain autonomous driving as much as possible while delaying the termination of autonomous driving as much as possible. To this end, the failure treatment device 300 may include a failure treatment controller 301, a failure detection device 302, a vehicle movement determination device 303, a stop necessity determination device 304, a driving route determination device 305, and a parking location search device 306.

When a failure occurs in the vehicle in autonomous driving, the failure treatment controller 301 may control an actuator included in the vehicle. For example, when a failure occurs in the electronic parking of the vehicle in autonomous driving, the failure treatment controller 301 may enable stable autonomous driving of the vehicle even when a vehicle is broken, by resetting the vehicle's route, controlling driving, and/or controlling parking. For example, the failure treatment controller 301 may be a module integrated with the vehicle control device 101 or a separate module from the vehicle control device 101.

According to an embodiment, the failure treatment controller 301 may include a communication device 310, storage 320, and a processor 330.

The communication device 310 may be a hardware device implemented with various electronic circuits for transmitting and receiving signals via a wireless or wired connection and may send and receive information with devices in the autonomous vehicle based on a network communication technology in the autonomous vehicle. For example, a network communication technology of the autonomous vehicle may include at least one of controller area network (CAN) communication, local interconnect network (LIN) communication, or Flex-Ray communication.

In addition, the communication device 310 may communicate with at least one of a server outside the vehicle, infrastructure, or another vehicle through wireless Internet access or short range communication technology.

Here, as the wireless communication technology, the wireless Internet technology may include at least one of wireless LAN (WLAN), wireless Broadband (Wibro), Wi-Fi, or World Interoperability for Microwave Access (Wimax). Also, a short-range communication technology may include at least one of Bluetooth, ZigBee, Ultra Wideband (UWB), Radio Frequency Identification (RFID), or Infrared Data Association (IrDA).

For example, the communication device 310 may perform in-vehicle communication. For example, the communication device 310 may perform in-vehicle communication with at least one of the vehicle control device 101, the electronic parking device 204, the failure detection device 302, the vehicle movement determination device 303, the stop necessity determination device 304, the driving route determination device 305, or the parking location search device 306.

The storage 320 may store the sensed result of the failure detection device 302, data obtained by the processor 330, or data and/or algorithm necessary for the processor 330 to operate. For example, the storage 320 may store logic (an algorithm) for responding to an electronic parking failure in autonomous driving of the vehicle.

The storage 320 may include at least one type of a storage medium among a flash memory type of a memory, a hard disk type of a memory, a micro type of a memory, a card type (e.g., a secure digital (SD) card or an eXtream Digital (XD) card) of a memory, a random access memory (RAM) type of a memory, a static RAM (SRAM) type of a memory, a read-only memory (ROM) type of a memory, a programmable ROM (PROM) type of a memory, an electrically erasable PROM (EEPROM) type of a memory, a magnetic RAM (MRAM) type of a memory, a magnetic disc type of a memory, or an optical disc type of a memory.

The processor 330 may be electrically connected to at least one of the communication device 310 or the storage 320, may electrically control each of the components, may be an electrical circuit that executes the instructions of software, and may perform various data processing and calculation described below. The processor 330 may include, for example, an electronic control unit (ECU), a micro controller unit (MCU), or another sub-controller, which is mounted on a vehicle.

The processor 330 may control the overall vehicle (or a broken vehicle) that has a fault in electronic parking in autonomous driving. When an electronic parking failure signal is received from the failure detection device 302, the processor 330 may be activated. The processor 330 may perform at least one of a driving algorithm or a parking algorithm of a broken vehicle based on information about surrounding environments sensed by using a sensing device and driving information about the vehicle.

The processor 330 may determine that an operating mode at a point in time when a vehicle arrives at a destination provided through a navigation system or near the destination, as a parking mode and may execute the parking algorithm stored in the storage 320. For example, the processor 330 may determine the operating mode until a broken vehicle is parked at a parking location from a state where a few minutes (e.g., 5 minutes) remains until the broken vehicle arrives at the destination, as a parking mode.

In the parking mode of a broken vehicle, the processor 330 may search for a parking location and may control the parking of the broken vehicle. When the parking mode of the broken vehicle is completed, the processor 330 may control the broken vehicle by switching from a parking mode to a monitoring mode.

When it is determined that there is the movement of the vehicle in the monitoring mode after the parking mode ends, the processor 330 may request the parking location search device 306 to search for a parking location again. The processor 330 may control the broken vehicle such that the broken vehicle moves again to the found parking location.

After the parking mode of the vehicle moved to the found parking location is completed, the processor 330 may control the vehicle movement determination device 303 so as to monitor the movement of the broken vehicle in real time.

The processor 330 may determine the operating mode until the broken vehicle starts driving and then arrives near the destination provided through a navigation system, as the driving mode and may execute the driving algorithm stored in the storage 320.

For example, the processor 330 may determine an operating mode in a state where there are a few minutes (e.g., 5 minutes) or more left before a vehicle reaches the destination, as the driving mode. In a driving mode of the broken vehicle, the processor 330 may set a driving route again and may control the driving of the broken vehicle. In a driving mode of the broken vehicle, the processor 330 may control the broken vehicle at a low speed in a congestion section and may minimize a stop time of the broken vehicle.

The failure detection device 302 may determine whether a vehicle in autonomous driving has failed. For example, the failure detection device 302 may diagnose the failure of a electronic parking system of a vehicle in autonomous driving and may identify that a fault occurs.

When the electronic parking device 204 fails to operate normally depending on a control signal of the vehicle control device 101, the failure detection device 302 may determine that the electronic parking device 204 has failed. Moreover, when a signal scheduled to be received from the electronic parking device 204 is not received by the vehicle control device 101 during a predetermined time, the failure detection device 302 may determine that the communication equipment of the electronic parking device 204 has failed.

The parking location search device 306 may search for an optimal parking location by using a gradient for each parking location sensed through the sensing device 205. In a parking mode of a vehicle having broken electronic parking, the parking location search device 306 may search for a parking location having a gradient that is not greater than a specific value (e.g., 0%).

The vehicle movement determination device 303 may monitor the movement of the vehicle while the vehicle is stopped. After the parking mode of a vehicle having broken electronic parking is completed, the vehicle movement determination device 303 may monitor the movement of the broken vehicle.

In a state where the main brake and electronic parking of the vehicle having broken electronic parking are released, the vehicle movement determination device 303 may turn off the starting of the broken vehicle and may monitor the movement of the broken vehicle after the parking mode is completed.

The vehicle movement determination device 303 may detect a vehicle speed signal of the broken vehicle in which the parking mode is completed. When the detected vehicle speed signal is not less than a predetermined speed, the vehicle movement determination device 303 may determine that there is the movement of the broken vehicle.

When the detected vehicle speed signal is not greater than or less than the predetermined speed, the vehicle movement determination device 303 may determine that there is no movement of the broken vehicle. For example, when the vehicle speed signal of the vehicle in which the parking mode is completed is not less than or greater than 0.1 km/h, the vehicle movement determination device 303 may determine that there is the movement of the broken vehicle. As another example, when the vehicle speed signal of the broken vehicle in which the parking mode is completed is not greater than or less than 0.1 km/h, the vehicle movement determination device 303 may determine that there is no movement of the broken vehicle.

When the broken vehicle having broken electronic parking is in a driving mode, the driving route determination device 305 may reset the driving route such that a driving route does not include a gradient road (e.g., downhill and/or uphill). The driving route determination device 305 may reset the driving route so as to bypass a road where a gradient indicating a change ratio of a height to a length of a center line in a traveling direction of the road is not less than a specific value (e.g., 10%).

In a driving mode of a vehicle having broken electronic parking, the stop necessity determination device 304 may determine a congestion section. The stop necessity determination device 304 may determine the congestion section based on vehicle speed information provided by the sensing device 205 and road situation information provided by a navigation system.

Figure 2A:
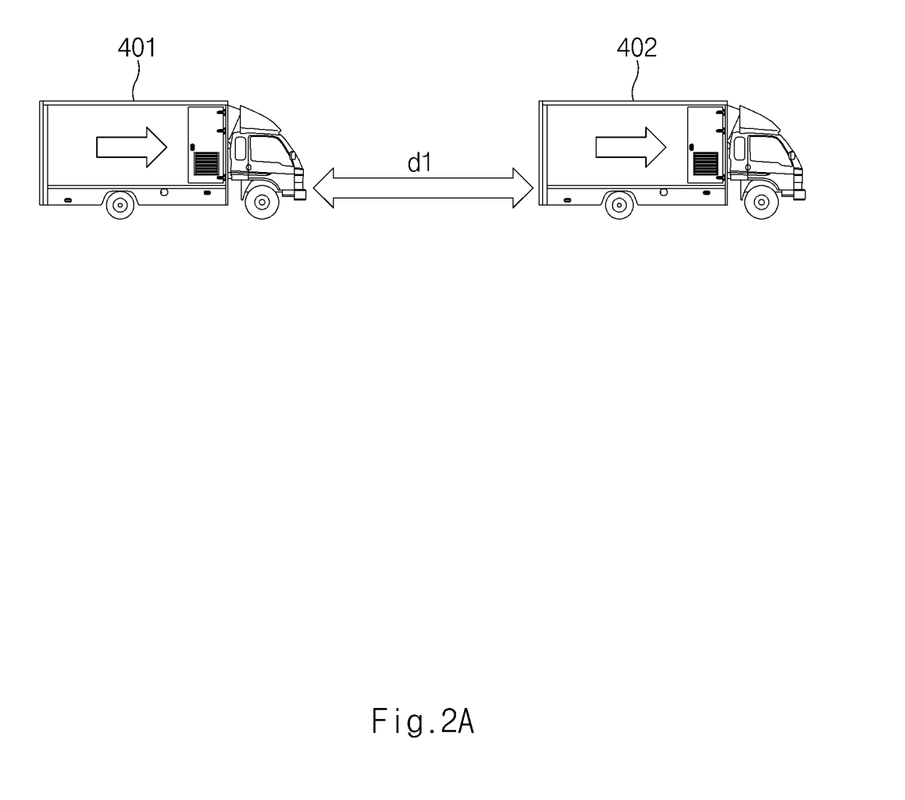
FIGS. 2A to 2C are diagrams for describing an inter-vehicle distance from a front vehicle while a vehicle is autonomously driving, in an apparatus and method for controlling an autonomous vehicle, according to an embodiment of the present disclosure.
Figure 2B:
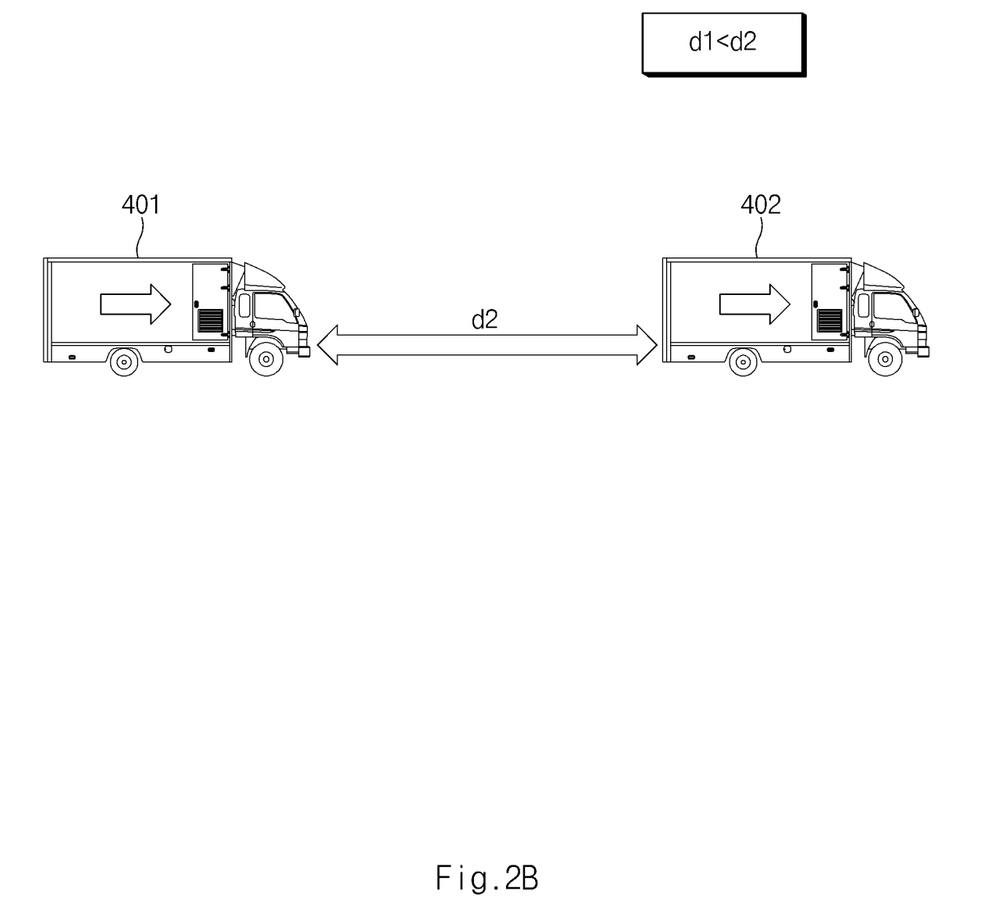
Figure 2C:
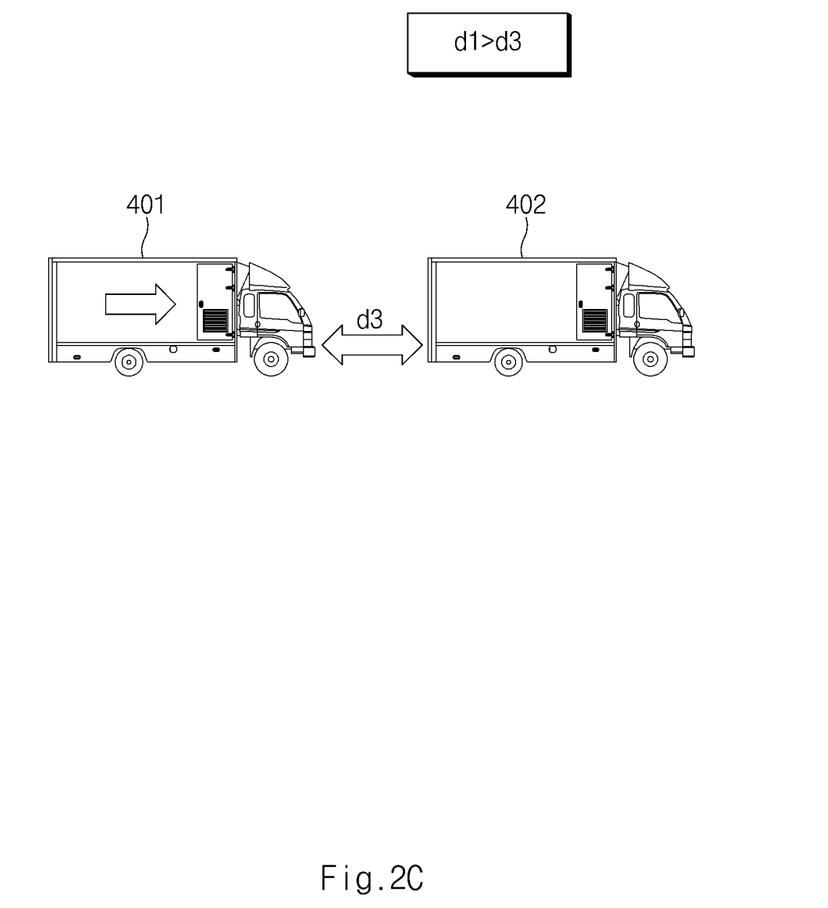

FIGS. 2A to 2C are diagrams for describing an inter-vehicle distance from a front vehicle while a vehicle is autonomously driving, in an apparatus and method for controlling an autonomous vehicle, according to an embodiment of the present disclosure.

As shown in FIGS. 2A to 2C, an autonomous vehicle 401 may drive while maintaining a specific inter-vehicle distance from a forward vehicle 402 thus being driven. The forward vehicle 402 may include a road user (e.g., a vehicle, a bicycle, or a motorcycle) driving immediately in front of the autonomous vehicle 401.

As shown in FIG. 2A, the autonomous vehicle (or a broken vehicle) 401 where electronic parking failure occurred during autonomous driving may maintain a first inter-vehicle distance d1 from the forward vehicle 402 in a traffic smooth section. The first inter-vehicle distance d1 may be a safe distance for avoiding an accident with the forward vehicle 402.

When the broken vehicle 401 is in a driving mode in a traffic congestion section, the processor 330 may control the speed of the broken vehicle 401. As shown in FIG. 2B, in the traffic congestion section, the processor 330 may control the speed of the broken vehicle 401 such that the broken vehicle 401 is capable of maintaining a second inter-vehicle distance d2 from the forward vehicle 402.

In the traffic congestion section, the processor 330 may perform deceleration control on the broken vehicle 401 such that the broken vehicle 401 is capable of maintaining the second inter-vehicle distance d2 longer than the first inter-vehicle distance d1. The second inter-vehicle distance d2 may be set to 'M' times (here, 'M' is a positive rational number greater than 1) as long as the first inter-vehicle distance d1. For example, the second inter-vehicle distance d2 may be set to 1.5 times as long as the first inter-vehicle distance d1.

In the congestion section, the processor 330 may control the broken vehicle 401 so as to be spaced from the forward vehicle 402 by the second inter-vehicle distance d2, thereby minimizing a situation in which the broken vehicle 401 is stopped.

When it is necessary to stop the broken vehicle 401 in the traffic smooth section or traffic congestion section, the processor 330 may control the speed of the broken vehicle 401. As shown in FIG. 2C, when it is necessary to stop the broken vehicle 401, the processor 330 may control the speed of the broken vehicle 401 so as to maintain a third inter-vehicle distance d3 shorter than the first inter-vehicle distance d1.

The third inter-vehicle distance d3 may be set to 'N' times (here, 'N' is a positive rational number less than 1) as short as the first inter-vehicle distance d1. For example, the third inter-vehicle distance d3 may be set to 0.8 times as long as the first inter-vehicle distance d1. When it is necessary to stop a broken vehicle in driving, the processor 330 may control the broken vehicle 401 so as to be spaced from the forward vehicle 402 by the third inter-vehicle distance d3, thereby minimizing a situation in which the broken vehicle 401 is stopped.

Besides, when the broken vehicle 401 needs to be stopped due to the stop of the forward vehicle 402, the processor 330 may set the speed of the broken vehicle 401 as a second speed that is K times as slow as the first speed at a point in time when the broken vehicle 401 maintains the first inter-vehicle distance d1.

For example, the second speed may be set to 'K' times (here, 'K' is a positive rational number less than 1) as slow as the first speed. For example, the second speed may be set to be 0.5 times slower than the first speed. Accordingly, the broken vehicle 401 may arrive late at a location of the forward vehicle 402 that is stopped, thereby reducing the stop time of the broken vehicle 401.

Figure 3:
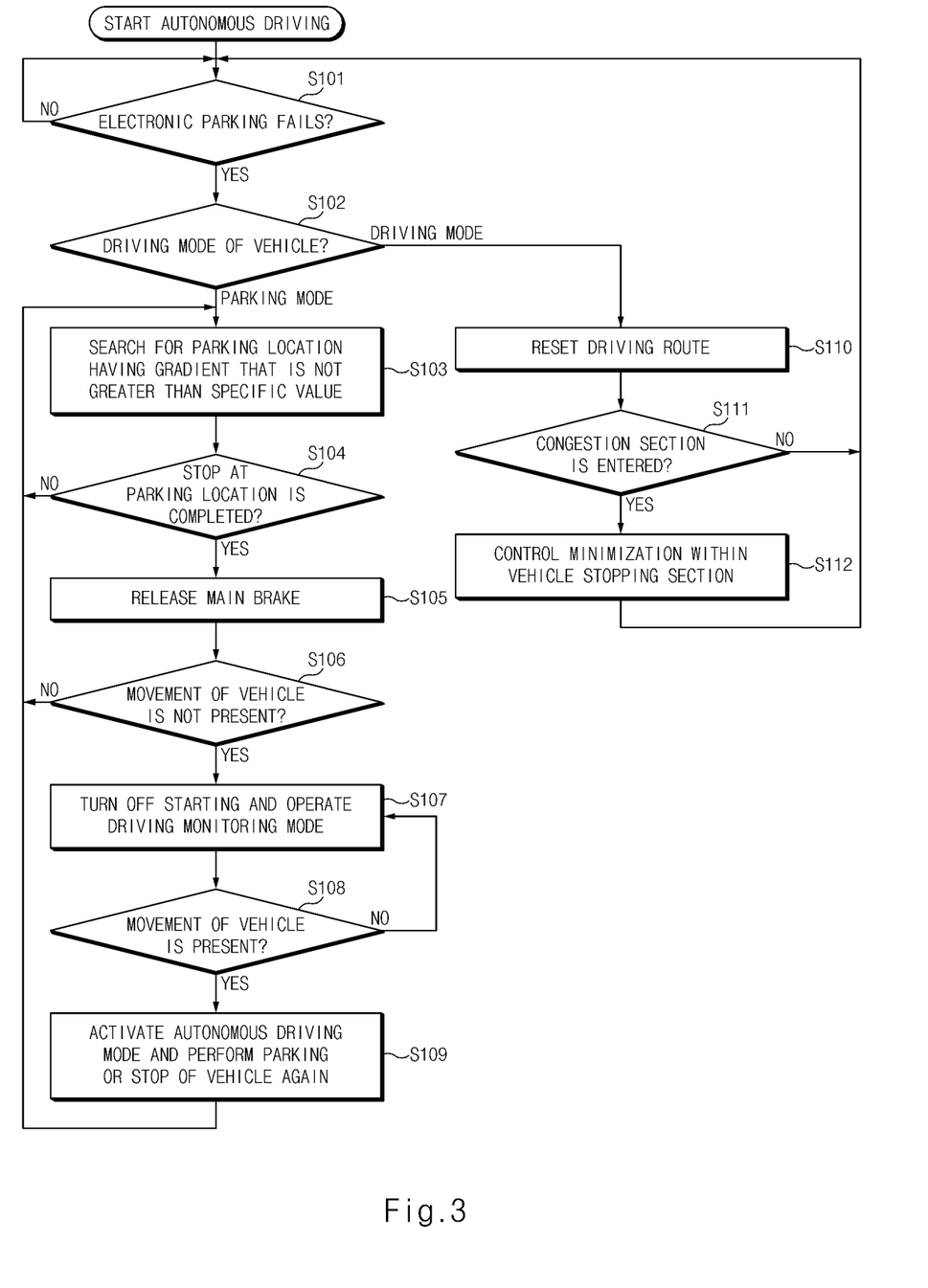
FIG. 3 is a flowchart for specifically describing an autonomous vehicle controlling method, to which an autonomous vehicle control apparatus is applied, according to an embodiment of the present disclosure.

Hereinafter, according to an embodiment of the present disclosure, an autonomous driving controlling method will be described in detail with reference to FIG. 3. FIG. 3 is a flowchart for describing a vehicle controlling method, according to an embodiment of the present disclosure. The autonomous driving control method shown in FIG. 3 will be described with reference to FIGS. 1 and 2A to 2C.

Hereinafter, it is assumed that the vehicle system 100 of FIG. 1 performs the process of FIG. 3. In addition, in a description of FIG. 3, it may be understood that an operation described as being performed by a device is controlled by the processor 330 of the failure treatment device 300.

In operation S101, the failure detection device 302 may diagnose whether the electronic parking of a vehicle in autonomous driving has failed, and may determine whether the electronic parking has failed. When a function of the electronic parking is normal, the vehicle control device 101 may control the vehicle 401 in autonomous driving such that the vehicle 401 is capable of driving while maintaining the first inter-vehicle distance d1 from the forward vehicle 402.

In operation S102, when the function of the electronic parking is broken, the failure treatment controller 301 may determine whether the broken vehicle 401 is in a driving mode or a parking mode. The failure treatment controller 301 may determine an operating mode at a point in time when the vehicle 401 arrives at or near a destination provided through a navigation system, as the parking mode.

For example, the failure treatment controller 301 may determine the operating mode until the broken vehicle 401 is parked at a parking location from a state where a few minutes (e.g., 5 minutes) remains until the broken vehicle 401 arrives at the destination, as the parking mode. The failure treatment controller 301 may determine the operating mode until the broken vehicle 401 starts driving and then arrives near the destination provided through the navigation system, as the driving mode. For example, the failure treatment controller 301 may determine an operating mode in a state where there are a few minutes (e.g., 5 minutes) or more left before a vehicle reaches the destination, as the driving mode.

In operation S103, when it is determined by the failure treatment controller 301 that the broken vehicle 401 is in the parking mode, the parking location search device 306 may search for an optimal parking location by determining a gradient for each parking location. The parking location search device 306 may search for a parking location having a gradient that is not greater than a specific value (e.g., 0% to 10%). For example, the parking location search device 306 may search for a parking location having a gradient of 0%.

In operation S104, the vehicle movement determination device 303 may determine whether the broken vehicle 401 has been stopped at a parking location where a gradient is not greater than a specific value.

In operation S105, when the broken vehicle is completely stopped at the parking location, the failure treatment controller 301 may release a main brake.

In operation S106, the vehicle movement determination device 303 may determine whether there is the movement of the broken vehicle 401 of which the main brake is released.

In operation S107, when there is no movement of the broken vehicle 401, the failure treatment controller 301 may turn off the starting of the broken vehicle 401. The failure treatment controller 301 may control the broken vehicle 401 such that an operating mode of the broken vehicle 401 is capable of being switched from a parking mode to a monitoring mode.

In operation S108, in the monitoring mode, the vehicle movement determination device 303 may determine whether the movement of the broken vehicle 401 is present.

In operation S109, when the movement of the broken vehicle 401 is present in the monitoring mode, the failure treatment controller 301 may activate an autonomous driving mode and may control the broken vehicle 401 such that the parking/stop of the broken vehicle 401 is performed again.

In operation S110, when it is determined that the broken vehicle 401 is in the driving mode, the driving route of the broken vehicle 401 may be reset to a route that does not include a road having a gradient greater than or equal to a specific value (e.g., 10%). The failure treatment controller 301 may control the broken vehicle 401 such that the broken vehicle 401 drives while maintaining the predetermined first inter-vehicle distance d1 from the forward vehicle 402.

In operation S111, the stop necessity determination device 304 may determine a congestion section of a road on which the broken vehicle 401 is driving.

In operation S112, when it is determined by the stop necessity determination device 304 that at least part of a route for driving is a congestion section, the failure treatment controller 301 may convert an inter-vehicle distance between the broken vehicle 401 and the forward vehicle 402 to the second inter-vehicle distance d2.

The failure treatment controller 301 may perform deceleration control on the broken vehicle 401 such that the autonomous vehicle and a forward vehicle are spaced from each other by the second inter-vehicle distance d2 longer than the first inter-vehicle distance d1. The second inter-vehicle distance may be set to 'M' times (here, 'M' is a positive rational number greater than 1) as long as the first inter-vehicle distance.

For example, the second inter-vehicle distance d2 may be set to 1.5 times as long as the first inter-vehicle distance d1. In the congestion section, the failure treatment controller 301 may control the broken vehicle 401 such that an inter-vehicle distance from the forward vehicle 402 increases by the second inter-vehicle distance d2, thereby minimizing a situation in which the broken vehicle 401 is stopped.

In operation S112 according to another embodiment, when it is determined by the stop necessity determination device 304 that at least part of a route for driving is a stop section, the failure treatment controller 301 may convert an inter-vehicle distance between the broken vehicle 401 and the forward vehicle 402 to the third inter-vehicle distance d3.

The failure treatment controller 301 may perform deceleration control on the broken vehicle 401 such that the broken vehicle 401 and the forward vehicle 402 are close to each other by the third inter-vehicle distance d3 shorter than the first inter-vehicle distance d1. The third inter-vehicle distance d3 may be set to 'N' times (here, 'N' is a positive rational number less than 1) as short as the first inter-vehicle distance d1.

For example, the third inter-vehicle distance d3 may be set to 0.8 times as short as the first inter-vehicle distance d1. In a stop section within the congestion section, the failure treatment controller 301 may control the broken vehicle 401 such that the broken vehicle 401 arrives late at a location of the forward vehicle 402 thus being stopped. Accordingly, the broken vehicle 401 may arrive late at a location of the forward vehicle 402 that is stopped, thereby reducing the stop time of the broken vehicle 401.

Figure 4:
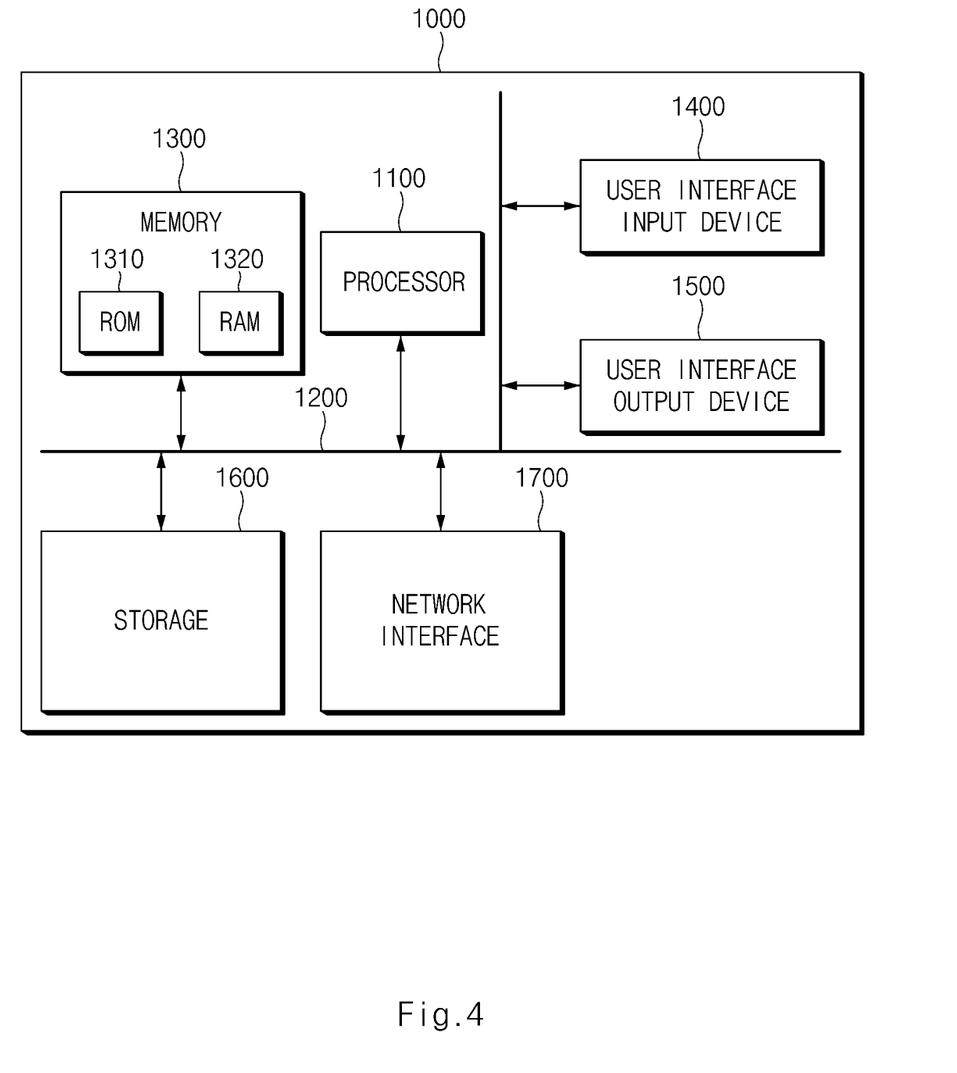
FIG. 4 illustrates a computing system according to an embodiment of the present disclosure.

FIG. 4 illustrates a computing system for executing a method for controlling an autonomous vehicle, according to an embodiment of the present disclosure.

Referring to FIG. 4, an autonomous vehicle controlling method according to an embodiment of the present disclosure may be implemented through a computing system 1000. The computing system 1000 may include at least one processor 1100, a memory 1300, a user interface input device 1400, a user interface output device 1500, storage 1600, and a network interface 1700, which are connected with each other through a bus 1200.

The processor 1100 may include a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) and a random access memory (RAM).

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM.

The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

The present technology may implement autonomous driving control in consideration of a condition that electronic parking failure occurs, when the electronic parking failure occurs in a vehicle at a point in time when autonomous driving is initiated.

Furthermore, the present technology may be designed not to release an autonomous driving mode when an electronic parking failure occurs in a vehicle at a point in time when autonomous driving is initiated, thereby increasing the utilization of autonomous driving.

Moreover, the present technology may not be necessary to separately take a break for repairing an electronic parking failure in a vehicle at a point in time when autonomous driving is initiated. That is, the present technology may prevent the occurrence of a situation in which a user of a vehicle gets off and boards another vehicle when an electronic parking failure occurs in a vehicle in which autonomous driving is initiated, or in which it is impossible to transfer or deliver a load loaded in a broken vehicle to another vehicle.

In addition, the present technology may be applied not only to a personal vehicle but also to a vehicle capable of autonomous driving (e.g., autonomous driving-based robotaxi).

Besides, a variety of effects directly or indirectly understood through the specification may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An autonomous vehicle control apparatus, the apparatus comprising:
  a processor configured to control autonomous driving when a vehicle has a failure; and
  a storage configured to store a driving mode logic and a parking mode logic driven by the processor,
  wherein the processor is configured to:
    determine an estimated time of arrival (ETA) for the vehicle to arrive at a destination based on a failure signal of the vehicle;
    determine an operating mode of a broken vehicle, which is detected based on the failure signal, as a parking mode based on determination that the ETA is less than a predetermined threshold;
    determine the operating mode of the broken vehicle as a driving mode on a first driving route based on determination that the ETA is greater than or equal to the predetermined threshold;
    execute the parking mode logic such that the parking mode logic searches for a parking location of the broken vehicle and parks the broken vehicle at the parking location, when the operating mode is the parking mode;
execute the driving mode logic such that the broken vehicle drives on a second driving route excluding a ramp while the broken vehicle maintains a first inter-vehicle distance from a forward vehicle, when the operating mode is the driving mode; and
execute the driving mode logic such that the broken vehicle drives while the broken vehicle maintains a second inter-vehicle distance longer than the first inter-vehicle distance, when the second driving route includes a congestion section.

2. The apparatus of claim 1, further comprising:
a failure detection device configured to generate the failure signal based on detecting failure of electronic parking of the vehicle;
a parking location search device configured to determine a gradient for the respective parking location of the broken vehicle and to search for the parking location;
a vehicle movement determination device configured to determine a movement of the broken vehicle in a stopped state of the broken vehicle;
a driving route determination device configured to set the second driving route of the broken vehicle; and
a stop necessity determination device configured to determine the congestion section in the driving mode of the broken vehicle.

3. The apparatus of claim 2, wherein the parking location search device searches for the parking location having the gradient that is less than or equal to a specific value, when the current driving situation of the broken vehicle is the parking mode, and
wherein the processor is configured to:
cause the broken vehicle to park at the found parking location.

4. The apparatus of claim 2, wherein the processor is configured to:
cause the vehicle movement determination device to execute a monitoring mode for monitoring a movement of the broken vehicle after the parking mode of the broken vehicle ends.

5. The apparatus of claim 4, wherein the parking location search device searches for a parking location of the broken vehicle again when the monitored result indicates that the movement of the broken vehicle is detected, and
wherein the processor is configured to:
cause the broken vehicle to park again at the found parking location.

6. The apparatus of claim 1, wherein the processor is configured to:
execute the driving mode logic such that the broken vehicle drives on the second driving route excluding the ramp having a gradient that is not less than a specific value when the current driving situation is the driving mode.

7. The apparatus of claim 1, wherein the processor is configured to:
cause the broken vehicle to decelerate when the second driving route includes the congestion section.

8. The apparatus of claim 1, wherein the processor is configured to:
cause the broken vehicle to stop while the broken vehicle maintains a third inter-vehicle distance from the forward vehicle, when it is necessary to stop the broken vehicle, and
wherein the third inter-vehicle distance is shorter than the first inter-vehicle distance.

9. The apparatus of claim 1, wherein the processor is configured to:
cause the broken vehicle to stop while the broken vehicle decelerates, when the forward vehicle is stopped.

10. The apparatus of claim 9, wherein the processor is configured to:
cause the broken vehicle to drive at a first speed when the forward vehicle is driving; and
cause the broken vehicle to drive at a second speed slower than the first speed when the forward vehicle is stopped.

11. A vehicle controlling method, the method comprising:
determining, by a processor, an estimated time of arrival (ETA) for the vehicle to arrive at a destination based on a failure signal of the vehicle;
determining, by the processor, an operating mode of a broken vehicle, which is detected based on the failure signal, as a parking mode based on determination that the ETA is less than a predetermined threshold;
determining, by the processor, the operating mode of the broken vehicle as a driving mode on a first driving route based on determination that the ETA is greater than or equal to the predetermined threshold;
executing, by the processor, a parking mode logic such that the parking mode logic searches for a parking location of the broken vehicle and parks the broken vehicle at the parking location, when the operating mode is the parking mode;
executing, by the processor, a first driving mode logic such that the broken vehicle drives on a second driving route excluding a ramp while the broken vehicle maintains a first inter-vehicle distance from a forward vehicle, when the operating mode is the driving mode; and
executing, by the processor, a second driving mode logic such that the broken vehicle drives while the broken vehicle maintains a second inter-vehicle distance longer than the first inter-vehicle distance, when the second driving route includes a congestion section.

12. The method of claim 11, wherein the executing of the parking mode logic includes:
searching for the parking location having a gradient that is less than or equal to a specific value; and
causing the broken vehicle to park at the found parking location.

13. The method of claim 11, further comprising:
determining, by the processor, a movement of the broken vehicle by executing a monitoring mode for monitoring a movement of the broken vehicle after the parking mode of the broken vehicle ends.

14. The method of claim 13, further comprising:
searching for a parking location of the broken vehicle again when the monitored result indicates that the movement of the broken vehicle is detected; and
causing the broken vehicle to again park at the found parking location.

15. The method of claim 11, wherein the executing of the first driving mode logic includes:
executing the first driving mode logic such that the broken vehicle drives on the second driving route excluding the ramp having a gradient that is not less than a specific value.

16. The method of claim 11, further comprising:
causing, by the processor, the broken vehicle to decelerate when the second driving route includes the congestion section.

17. The method of claim 11, further comprising:
causing, by the processor, the broken vehicle to stop while the broken vehicle maintains a third inter-vehicle distance from the forward vehicle, when it is necessary to stop the broken vehicle, and
wherein the third inter-vehicle distance is shorter than the first inter-vehicle distance.

18. The method of claim 11, further comprising:
causing, by the processor, the broken vehicle to stop while the broken vehicle decelerates, when the forward vehicle is stopped.

* * * * *